Figure 1:
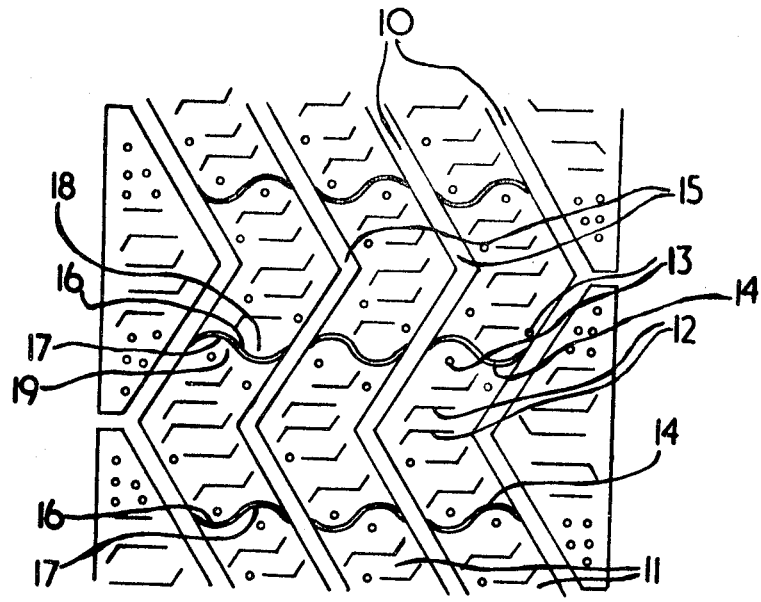

United States Patent [19]
Hart et al.

[11] 3,749,145
[45] July 31, 1973

[54] PNEUMATIC TIRES
[75] Inventors: Claude A. Hart, Sutton Coldfield; Eric W. Haycock, Alrewas near Burton-upon-Trent, Staffordshire, both of England
[73] Assignee: Dunlop Holdings Limited, London, England
[22] Filed: June 10, 1971
[21] Appl. No.: 151,706

[30] Foreign Application Priority Data
June 13, 1970 Great Britain................. 28,724/70

[52] U.S. Cl............................................ 152/209 R
[51] Int. Cl.......................................... B60c 11/06
[58] Field of Search...................... 152/209, DIG. 3

[56] References Cited
UNITED STATES PATENTS
3,534,798 10/1970 Ravenhall........................ 152/209
2,821,231 1/1958 Kraft............................. 152/DIG. 3

Primary Examiner—James B. Marbert
Attorney—Stevens, Davis, Miller & Mosher

[57] ABSTRACT

A pneumatic tire having a breaker, particularly of steel cord fabric and circumferential tread ribs provided with transverse slots extending across the whole or a major portion of the rib width to separate areas of tread rubber which will interlock to resist a sideways force applied to the tire, of which the following is a specification.

15 Claims, 2 Drawing Figures

Patented July 31, 1973 3,749,145

PNEUMATIC TIRES

This invention relates to pneumatic tires particularly to radial ply car tires.

In accordance with the invention a pneumatic tire comprises a tread, a breaker radially inwards of the tread, the tread having at least one rib extending in a substantially circumferential general direction, a plurality of narrow transversely-extending slots being provided in the rib, each slot extending from one edge of the rib across the whole or a major portion of the rib width, so as to separate or effectively separate areas of tread rubber in the rib which will interlock one with another to resist a transverse force applied to the tread.

Preferably, the pneumatic tire comprises a radial ply carcass, and the breaker steel cord fabric.

Preferably also, the slots are of variable depth being shallower at the edge of the rib and have an average depth which is less than the rib height.

A tire having features of the preceding paragraphs will have enhanced circumferential flexibility compared with a tire having circumferentially continuous ribs since each rib is broken up into separate areas of tread rubber by the transverse slots while retaining good lateral rigidity since the areas of rubber on each side of the slots interlock and provide resistance to lateral distortion or displacement forces.

The or each rib is preferably bounded by wide circumferentially extending grooves and is also provided with further slots and/or pin-hole like chambers. The grooves do not close up under normal operating conditions of the tire, i.e., when the tire is inflated to its normal pressure and not overloaded, to drain from the contact patch the bulk of water displaced by the tire when running on wet ground while the thin film of water remaining between tire and ground surface is taken up by the slots and/or chambers to be released under centrifugal action when the slots and/or chambers move out of the contact patch.

Two embodiments of the invention will now be described by way of example with reference to the accompanying drawings FIGS. 1 and 2 which respectively show a plan view of the tread of two tires according to the invention.

Each tire shown in the drawings comprises a radial ply car tire having a breaker of steel cords and a tread provided with wide, generally circumferentially-extending zig-zag main drainage grooves 10 for draining the bulk of water from the contact patch.

Between each pair of adjacent circumferential grooves is defined a circumferentially-extending zig-zag rib 11 provided with a plurality of slots 12 and cylindrical holes 13 which soak up the thin film of water remaining in the contact patch after the bulk water has been cleared through the wide grooves 10.

The ribs of tire shown in FIG. 1 are each provided with transverse sinusoidal slots 14 which extend across the whole rib width to join adjacent wide grooves 10, the junction between each sinusoidal slot and groove occuring between groove apices 15. The sinusoidal form of each slot 14 divides each rib 11 into blocks having curved edges, each of which edges 16 interengage with a curved edge 17 of an adjacent block.

Under the influence of a transverse force, e.g. during cornering, each block in the contact patch will tend to be displaced axially and at least part of each sinusoidal slot will close up so that an area of tread rubber adjacent the curved edge of one block will interlock with the adjacent area of tread rubber in the adjacent block in a supporting action to provide resistance to the transverse force. For example, the area of rubber designated by reference number 16 will interlock with the area of rubber 19 of the adjacent block.

Since the ribs are broken into blocks by the sinusoidal slots the flexibility of each rib in a circumferential direction will be increased simultaneously with providing rigidity in a transverse direction due to the interlocking effect referred to in the preceding paragraph.

Figure 2:
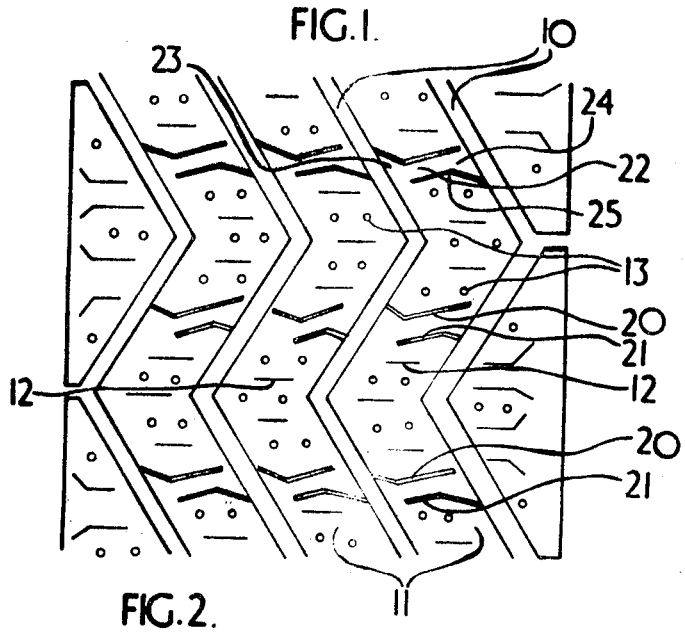

The ribs 11 of the tire tread shown in FIG. 2 are each provied with pairs (20,21) of transversely extending zig-zag slots, each slot extending for approximately three quarters of the rib width, one slot 20 in each pair extending form one side of a rib, the other slot, 21, extending from the opposite side of the rib. Each slot has only two limbs and is arranged such that the limbs nearer the centre of the rib are parallel so as to define a narrow parallel-sided length 22 of rubber, but nearer the edges of the rib the distance between the slots in each pair increases so as to form approximately wedge-shaped areas 23, 24 of rubber.

Under the influence of a side force the rubber in each rib 11 will tend to be displaced but the slots will at least partially close up, the wedge-shaped areas being supported by tread rubber on the other side of slots. For example, the area 24 will be supported by an area 25 under a sideways force. However, the circumferential flexibility of the ribs will be enhanced since the pairs of slots will act very similarly to a single slot extending the whole rib width.

Good lateral rigidity in combination with circumferential flexibility is particularly advantageous in a radial ply car tire having a tread reinforcement or breaker plies made from steel cords, the tire having improved stability, cooler running properties and improved tread life, the latter two of which are caused by the reduced distortion in the contact patch and reduced scrubbing effect on approaching and leaving the contact patch on account of the increased circumferential flexibility. The provision of wide drainage grooves and further slots and pin-hole like chambers improves the wet grip properties.

Having now described our invention — what we claim is:

1. A pneumatic tire comprising a tread, a breaker radially inwards of the tread, the tread having at least one rib extending in a circumferential direction, a plurality of narrow generally transversely-extending slots in the rib, each slot extending from one edge of the rib across at least a major portion of the rib width so as to at least effectively separate areas of tread rubber in the rib which will interlock with adjacent areas of tread rubber to resist a transverse force applied to the tread in either direction.

2. A pneumatic tire according to claim 1 wherein each slot extends across the whole rib width to separate areas of tread rubber in the rib which will interlock one with another to resist a transverse force applied to the tread.

3. A pneumatic tire according to claim 1 wherein the breaker comprises steel cord fabric.

4. A pneumatic tire according to claim 1 including a tread reinforcement.

5. A pnematic tire according to claim 4 wherein the tread reinforcement comprises steel cord fabric.

6. A pneumatic tire according to claim 1 including a radial ply carcass.

7. A pneumatic tire according to claim 1 wherein the slots are of variable depth.

8. A pneumatic tire according to claim 1 wherein the depth of the slots is shallower at the edge of the rib than elsewhere in the slot.

9. A pneumatic tire according to claim 1 wherein the average depth of the slots is less than the rib height.

10. A pneumatic tire according to claim 1 wherein the slots are of sinusoidal configuration.

11. A pneumatic tire according to claim 1 wherein the slots are of zig-zag configuration.

12. A pneumatic tire according to claim 1 wherein the slots are arranged in closely adjacent pairs defining a narrow portion of rubber therebetween.

13. The tire of claim 1 in which the circumferentially extending rib follows a zig-zag path and the slots intersect the rib between apices of the rib.

14. The tire of claim 1 in which the generally transversly-extending slots have a substantial portion of their length extending in a non-axial direction.

15. The tire of claim 14 in which the slots do not extend for the whole width of the rib.

* * * * *